(12) United States Patent
Keshavaraj et al.

(10) Patent No.: US 6,344,251 B1
(45) Date of Patent: *Feb. 5, 2002

(54) WELDED AIRBAG STRUCTURE

(75) Inventors: Ramesh Keshavaraj, LaGrange, GA (US); Joseph W. Fields, Oneida, TN (US)

(73) Assignee: Milliken & Company, Spartanburg, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,368

(22) Filed: Jun. 4, 1999

Related U.S. Application Data

(60) Provisional application No. 60/110,353, filed on Dec. 1, 1988.

(51) Int. Cl.[7] .................... B29D 22/02; B60R 21/16
(52) U.S. Cl. ................ 428/35.2; 428/36.1; 428/102; 428/193; 442/183; 280/728.1; 280/743.1
(58) Field of Search ............... 428/35.2, 35.5, 428/36.1, 193, 102; 280/728.1, 743.1; 442/183; 139/384 R

(56) References Cited

U.S. PATENT DOCUMENTS

| | | | |
|---|---|---|---|
| 2,525,355 A | 10/1950 | Hoyler | 154/214.6 |
| 3,990,726 A | 11/1976 | Oka et al. | 280/739 |
| 4,010,055 A | 3/1977 | Oka et al. | 156/266 |
| 4,860,395 A | 8/1989 | Smith | 5/420 |
| 5,277,966 A * | 1/1994 | Nakayama et al. | 428/225 |
| 5,302,432 A * | 4/1994 | Shigeta et al. | 428/36.1 |
| 5,533,755 A * | 7/1996 | Nelsen et al. | 280/743.1 |
| 5,618,595 A * | 4/1997 | Matsushima et al. | 428/35.2 |
| 5,667,307 A | 9/1997 | Chiu | 383/107 |
| 5,679,423 A | 10/1997 | Shah | 428/35.2 |
| 5,707,711 A * | 1/1998 | Kitamura | 428/35.2 |
| 5,788,270 A * | 8/1998 | Haland et al. | 280/729 |
| 5,833,915 A | 11/1998 | Shah | 264/491 |
| 5,879,767 A * | 3/1999 | Matsushima et al. | 428/35.2 |
| 5,897,929 A * | 4/1999 | Li et al. | 428/36.1 |
| 5,945,184 A * | 8/1999 | Nagata et al. | 428/35.2 |
| 5,945,185 A * | 8/1999 | Hirai et al. | 428/35.2 |
| 5,989,660 A * | 11/1999 | Moriwaki et al. | 428/35.2 |
| 5,997,034 A * | 12/1999 | Hirai et al. | 280/743.1 |
| 6,037,279 A * | 3/2000 | Brookman et al. | 280/728.1 |

FOREIGN PATENT DOCUMENTS

| | | |
|---|---|---|
| FR | 105910785 | 6/1970 |
| JP | 38-15077 | 8/1963 |
| JP | 2-162134 | 6/1990 |
| JP | 6-16099 | 1/1994 |
| WO | 91/18760 | 12/1991 |

* cited by examiner

*Primary Examiner*—Rena L. Dye
(74) *Attorney, Agent, or Firm*—Terry T. Moyer; Brenda D. Wentz

(57) ABSTRACT

An airbag having at least two composite layers of fabric R.F. welded around the periphery thereof to form the bag and, which, when R.F. welded has excellent seam strength and a specific inflation strength less than 1.2.

9 Claims, No Drawings

WELDED AIRBAG STRUCTURE

This application claims benefit of provisional application Ser. No. 60/110,353, filed Dec. 1, 1998.

FIELD OF THE INVENTION

The present invention relates to an improved construction for an inflatable cushion useful in opposing or side relation to a vehicle occupant. The present invention would also be useful for other types of transportation vehicles as well as machinery.

BACKGROUND

Inflatable protective cushions used in passenger vehicles are a component of relatively complex systems. The main elements of the systems are: an impact sensing device, an ignition system, a solid propellant material, an attachment device, a system enclosure, and an inflatable protective cushion. Upon sensing an impact, the propellant is ignited causing an explosive release of gas filling the cushion to a deployed state which can absorb the impact of a moving body.

Traditional driver's side cushions have been of a generally circular shape constructed from two circular pieces formed from material such as 315–840 denier nylon yarn. These circular pieces are seamed together around their periphery using traditional sewing techniques. Although this product has preformed in an acceptable manner, it has generally been recognized that the formation of a seam is a relatively time consuming process. In addition, the sewn seam serves as an area through which the inflation gases may escape. Examples of sewn driver's side cushions are provided in U.S. Pat. No. 5,533,755 to Nelsen et al. (incorporated by reference).

Passenger side cushions have to this point have been generally of a rather complex geometry formed from either single piece or multi-piece fabric panels. Such cushions, however have nonetheless continued to use basic sewn seams as the means of attaching and/or enclosing the panel structures.

It has recently been recognized that a cushion which deploys and has the capacity to remain inflated for a period of several seconds may provide substantial benefits when a vehicle is involved in a prolonged crash event such as a roll over situation. One such cushion is illustrated and described in U.S. Pat. No. 5,788,270 to Haland et al. (incorporated by reference). In such prolonged crash events, the cushion must be capable of accepting and maintaining a pressure for several seconds. In some embodiments this pressure may be as high as 40 or 50 psi. Accordingly, any seam structures must not serve as a conduit through which an inflation media can pass.

Haland et al. attempts to minimize pressure degradation within the impact cushion by substituting traditional sewn seems with interwoven connections between two layers of fabric such as may be formed using a jacquard weaving system. Notwithstanding the use of such interweaving technology, cushions formed according to the teachings in Haland et al. nonetheless require the application of at least two relatively heavy layers of silicone coating material in order to prevent the premature deflation of the airbag structure. The need for such coating is particularly acute at the interwoven seams which serve as the conduit through which the majority of the gas tends to escape.

Thus, whether a structure uses traditional sewn seems or interwoven connections between layers of fabric these points of joiner can unduly influence the rate of gas leakage from the cushion. Although other connective means, such as adhesives have been proposed, the strength of such seams has been generally unacceptable under heat aging conditions.

SUMMARY OF THE INVENTION

In view of the forgoing, it is a general object of the present invention to provide an inflatable restraint cushion possessing substantially leek proof seams and an increased inflation strength.

It is a further object of the present invention to provide an inflatable restraint cushion possessing leek proof seams in the form of a weld having a bond strength in both the peel and shear mode of not less that 10 lbs./inch, a fabric tensile strength of not less than 100 lbs./inch and, when inflated, a specific inflation strength less than 1.2.

It is an object of the present invention to provide an inflatable restraint cushion formed from welded material panels using high frequency welding techniques.

Additional objects and advantages of the invention will be set forth in part in the description which follows, and in part will be obvious from the description, or may be learned by practice of the invention. It is to be understood that both the forgoing general and the following detailed description are exemplary and explanatory only and are in no way tended to limit the scope of the invention.

DESCRIPTION OF PREFERRED EMBODIMENTS

As indicated above, sewn seams have proven to be adequate for most driver and passenger airbag applications because the gas retention in such bags is for such a short period of time. However, if the bag is being designed to protect the occupant during a prolonged crash event, there is a need to retain gas within the bag for a much longer period of time. In such applications, holes created by the sewing needle tend to expand in dimension under pressure and thereby lead to undesirable gas leakage. It has been determined that a highly efficient cushion structure with substantially leak proof seams can be produced through use of radio frequency welding techniques without sacrificing the overall strength of the structure.

High frequency welding using frequencies of 10 MHz or higher is useful for joining polymeric materials that have strong dipoles, such as PVC, polyurethanes and polyamides. It has been found that polymeric films or fabric coated or laminated with such a polymer may be bonded by means of high frequency welding. The bond strength attained through this process is typically about 60 to 150 pounds force per inch although values as high as about 250 pounds force per inch measured in both the peel and in the shear mode may be obtained.

In the potentially preferred practice of the present invention, an oxford or twill weave fabric or a knitted fabric formed from a material such a nylon or polyester yarns in the range of 40–840 denier is either coated or laminated to a film of about 1–5 ml gauge of polyurethane to form a composite structure. The fabric portion of the composite structure preferably has a total weight of about 2.5 to 15 oz/yard$^2$. The add-on weight of the film is preferably about 0.5 to 10 oz/yard$^2$. It is believed that the fabric tensile strength will range between about 100 to 750 lbs./inch. Other films such as polyamide, polyester, polyethane, etc. can be used, if desired.

In formation of the cushion according to the present invention, two layers of the composite are placed in contacting relation with one another so as to form a sandwich structure wherein the fabric forms the exterior while the film forms the interior thereof. This can be done in a peel mode, a shear mode or a combination thereof. The peel mode is when the layers of fabric extend in the same direction parallel to one another and the shear mode is when the overlying fabrics to be connected extend in opposite directions. Once this sandwich structure is formed, a high intensity field is applied across the structure by RF electrodes either at room temperature or heated to a temperature of about 50° which are pressed against the exterior of the structure. Heating of the film is localized in coordination with the electromagnetic field such that a weld is formed in a pattern matching the electrode placement.

Using the M.L —C-83489 specification to determine welded fabric joint strength and ASTM D-1683 specification to determine fabric strength the following formula was used to determine inflation strength.

$$\text{Specific Inflation Strength} = \frac{\text{Strength of the welded fabric joint (lbs./in)}}{\text{Fabric strength (lbs./in)}}$$

Using the above noted formula a series of tests were ran using various denier nylon yarns and the following results were obtained.

Welded Airbag Fabrics in Peel Mode

| Denier | Tensile (lbs./in) | Weld strength in peel (lbs./in) | | Specific inflation strength | |
|---|---|---|---|---|---|
| | | High | Low | High | Low |
| 210 | 220 | 130 | 55 | 0.590909 | 0.25 |
| 315 | 460 | 130 | 55 | 0.282609 | 0.119565 |
| 420 | 575 | 130 | 55 | 0.226087 | 0.095652 |
| 630 | 740 | 130 | 55 | 0.175676 | 0.074324 |
| 840 | 720 | 130 | 55 | 0.180556 | 0.076389 |

Welded Airbag Fabrics in Shear Mode

| Denier | Tensile (lbs./in) | Weld strength in peel (lbs./in) | | Specific Inflation strength | |
|---|---|---|---|---|---|
| | | High | Low | High | Low |
| 210 | 220 | 220 | 155 | 1 | 0.704545 |
| 315 | 460 | 460 | 320 | 1 | 0.695652 |
| 420 | 575 | 575 | 410 | 1 | 0.713043 |
| 630 | 740 | 740 | 521 | 1 | 0.704054 |
| 840 | 720 | 720 | 504 | 1 | 0.7 |

As can be seen the specific inflation strength of the various inflatable structures was substantially below 1.2

Another potentially preferred embodiment a pouch of polymeric film may be formed by high frequency welding around the perimeter. This pouch may then be inserted into a fabric bag structure to form a double layered bag in bag structure.

Another embodiment of the invention would involve using separate layers of fabric and film where one or two layers of film would be sandwiched between two layers of fabric and fabric and film would be welded together by the application of the high intensity field applied through the fabric to weld the layers together.

It has been found that a welding frequency of about 27.12 MHz is extremely efficient in forming a weld although other frequencies from about 10 to about 100 MHz may also be utilized. The weld which is formed is substantially impermeable to gas flow. Moreover, the strength in the peel and shear mode for such welds is excellent and the specific inflation strength is below 1.0.

Although the use of high frequency welded structures is particularly important for cushions which must be inflated for relatively long periods of time, it is likewise contemplated and considered to within the scope of this invention to utilize such technology in the formation of driver and passenger side cushions as well. In such applications, a high frequency weld may be used as an alternative for traditional sewn seams and proper dispersion of the inflation media during a collision event may be achieved through the use of vents as are well known to those of skill in the art. In one potentially preferred embodiment, it is contemplated that weldable film be disposed across the face panel of a driver bag and around only the boundary edge of the rear panel thereof. A weld is then formed around the perimeter to enclose the structure while nonetheless permitting the bag to maintain a relatively high porosity rear surface so as to permit rapid deflation following a collision event.

The present invention thus provides and inflatable cushion restraint which may be easily formed to have substantially impermeable welded seams. Moreover, such seams are formed without resulting in degradation to the fabric portion of the bag structure. As such the present invention provides a useful advancement over the state of the art.

What is claimed is:

1. An airbag comprising: a first layer of composite fabric and a second layer of composite fabric wherein said layers of composite fabric comprise multifilament yarns and a film or coating adhered to only one face of each of said layers of composite fabric; said first and second layers of composite fabric disposed in overlying relation so that said film or coating faces are facing one another; and a R.F. welded seam around a portion of the periphery of said layers of composite fabric securing said composite fabrics together.

2. The airbag of claim 1 wherein said airbag has a specific inflatable strength of less than 1.2.

3. The airbag of claim 2 wherein said textile fabric is woven.

4. The airbag of claim 2 wherein said textile fabric is knit.

5. The airbag of claim 3 or 4 wherein the yarns of said fabric are in the range of 40–840 denier.

6. An airbag comprising a first woven fabric comprised of multifilament yarns having a 1–5 ml thick film or coating adhered to a single side of said first woven fabric, a second woven fabric comprised of multifilament yarns having a 1–5 ml film or coating adhered to a single side of said second woven fabric and lying over said first fabric with the film or coating of each layer facing each other and a R.F. seam welded around a portion of the periphery of said merging fabrics to provide an airbag having a specific inflation strength of less than 1.2.

7. The airbag of claim 6 wherein each of said lower fabrics has a weight of about 2.5 to 15 oz./yd$^2$.

8. The airbag of claim 7 wherein said films have a weight of about 0.5 to 10 oz./yd$^2$.

9. The airbag of claim 8 wherein said fabrics have a tensile strength of about 100 to 750 lbs./inch.

* * * * *